Patented Oct. 10, 1922.

1,431,880

UNITED STATES PATENT OFFICE.

HENRY H. C. DUNWOODY, OF WASHINGTON, DISTRICT OF COLUMBIA.

PROCESS OF DESTROYING THE BOLL WEEVIL.

No Drawing.  Application filed April 1, 1922.  Serial No. 548,855.

*To all whom it may concern:*

Be it known that I, HENRY H. C. DUNWOODY, a citizen of the United States, residing at Washington, in the District of Columbia, have invented certain new and useful Improvements in Processes of Destroying the Boll Weevil; and I do hereby declare the following to be a full, clear, and exact description of the invention, such as will enable others skilled in the art to which it appertains to make and use the same.

This invention relates to a process of destroying the boll weevil, which infests cotton countries, and has for its object to provide a procedure which will be more efficient than those which have been heretofore proposed.

With this object in view, the invention consists in the novel steps constituting the process, all as will be more fully hereinafter disclosed and particularly pointed out in the claims.

In order that the precise invention may be the more clearly understood it is said:

The boll weevil attacks principally what is known as the "squares" of the cotton plant, and in its adult stage seeks protection for the greater portion of its time under what is known as the "bracts," so that it is quite difficult to reach the weevil from above downward while it is underneath these said squares. On the other hand, when the weevil comes out on top of the surface of the squares, of course, it is quite easy to reach him.

In addition to this, it is further well known that the adult weevil seeks moisture wherever it may be found on the surface of the plant. It is further well known that at present it is customary in poisoning the boll weevil to employ calcium arsenate in the form of a powder or in the dry state. Specialized methods and apparatus are used in applying this calcium arsenate powder, but in so far as I am aware no one has ever heretofore proposed to employ a much more violent poison in a liquid form and in a manner which will reach the weevil both when he is underneath the cotton squares, as well as when he is on top of the same.

In carrying out this invention, I employ a solution in water of an alkali metal cyanide such as potassium cyanide or sodium cyanide, and I apply the same to the plants in the form of a very fine mist or fog like spray, so that the minute vesicles or small particles of the mist will reach the under portions of the squares as well as the upper surfaces thereof.

Owing to the very highly poisonous nature of the cyanide an exceedingly small quantity is sufficient to destroy the weevil whenever he seeks moisture, and further, owing to the cyanide being in a water solution, the water or the poisonous solution readily attaches itself to the plant and stays there until its water evaporates whereupon it will again be effective when it is redissolved by reason of dew, fog or any other application of water, so long as it is not in the form of rain in quantities sufficient to wash it off.

In carrying out the invention, I may use any suitable apparatus, such, for example, as the hand mechanisms disclosed in the U. S. Patents #506,708, dated October 17, 1893, to Middleton, and #636,375, dated November 7, 1899, to Beariks, or I may use the larger forms of horse-drawn vehicles or motor propelled vehicles that are well known to be adapted for this purpose. However, in all the forms, the perforations through which the liquid cyanide solution escapes are made so small as to produce a veritable fog, and this fog, due to the fact that it partially floats in the air, attaches itself to the under side as well as to the top side of the cotton squares, and thus effectually poisons all surfaces of the plant.

The best time to begin the application of the solution to the crop is after the weevils have attacked a small percentage of the squares, say, 10% to 15% thereof, because it is well known that the cotton plant produces more squares than are required to develop into bolls and therefore one can afford to permit the weevils to attack a small portion of these squares without injury to the subsequent crop. And further, by waiting until the weevil has thoroughly demonstrated its presence in the crop, one can lessen the cost of treating the crop by thus avoiding unnecessary applications. If a heavy rain should follow an application of the poisonous solution, of course the poison would be washed away and the crop should be treated immediately afterwards in order to prevent the ravages of the pest.

During the period when the weevils are at their worst, it is found best to treat the crops three or four times with the poison with periods of, say, four or five days between treatments.

The potassium or sodium cyanide is found to be so very violent in its action that only comparatively weak solutions may be employed. The actual strength of the solution may be widely varied. I find that not more than, say, five pounds of sodium cyanide, for example, need be used to an acre of cotton at a single treatment, although this amount may be greatly increased when the pests are very numerous. Too strong a solution however, is apt to injure the plant, and therefore the solution employed is always too weak to do this.

What I claim is:

1. The process of treating plants for the purpose of destroying insect infestations and the like, which consists in applying a water solution of an alkali metal cyanide in the form of a fine mist like spray or fog capable of reaching all parts of the plant such as the under leaf surfaces and of a strength insufficient to injure the plant.

2. The process of destroying boll weevils infesting cotton plants which consists in applying to the upper and under surfaces of said plants a water solution of an alkali metal cyanide in the form of a fine mist like spray and of a strength insufficient to injure said plants, substantially as described.

In testimony whereof I affix my signature.

HENRY H. C. DUNWOODY.